US009875587B2

(12) United States Patent
Kim

(10) Patent No.: US 9,875,587 B2
(45) Date of Patent: Jan. 23, 2018

(54) SMART KEY AND METHOD OF CONTROLLING THE SAME

(71) Applicant: Hyundai Motor Company, Seoul (KR)

(72) Inventor: Sinjung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/144,402

(22) Filed: May 2, 2016

(65) Prior Publication Data

US 2017/0193717 A1    Jul. 6, 2017

(30) Foreign Application Priority Data

Jan. 4, 2016    (KR) .......................... 10-2016-0000262

(51) Int. Cl.
G07C 9/00    (2006.01)

(52) U.S. Cl.
CPC ..... *G07C 9/00007* (2013.01); *G07C 9/00309* (2013.01); *G07C 2009/00555* (2013.01); *G07C 2209/63* (2013.01)

(58) Field of Classification Search
CPC ...... G07C 9/00309; G07C 2009/00793; G07C 9/00571; G07C 9/00111; G07C 9/00103; G07C 2209/63; G07C 9/00904
USPC ....................................................... 340/5.61
See application file for complete search history.

(56) References Cited

U.S. PATENT DOCUMENTS

| | | | |
|---|---|---|---|
| 9,355,509 B1* | 5/2016 | Blatz | B60R 25/24 |
| 9,530,265 B2* | 12/2016 | Lee | G07C 9/00563 |

FOREIGN PATENT DOCUMENTS

| | | |
|---|---|---|
| JP | 2001342758 A | 12/2001 |
| JP | 2006342545 A | 12/2006 |
| JP | 2012-046918 A | 3/2012 |
| JP | 2013-127184 A | 6/2013 |
| JP | 2015040406 A | 3/2015 |
| JP | 2015089992 A | 5/2015 |
| KR | 10-2013-0079184 A | 7/2013 |
| WO | 2015084852 A1 | 6/2015 |

\* cited by examiner

*Primary Examiner* — Mark Blouin
(74) *Attorney, Agent, or Firm* — Mintz Levin Cohn Ferris Glovsky and Popeo, P.C.; Peter F. Corless

(57) ABSTRACT

A smart key for a vehicle includes: a communication unit including a low frequency (LF) antenna which receives an LF signal; and a control unit determining a strength and a direction vector of the LF signal. The control unit estimates a first location of the smart key based on the strength of the LF signal, estimates a second location of the smart key based on the direction vector of the LF signal, and determines a presence of a relay attack by analyzing the first location and the second location and comparing the first location with the second location.

20 Claims, 18 Drawing Sheets

FIG. 10

| ① | IDa | [ 2 7 3 ] | $D_1$ |
|---|-----|-----------|-------|
| ② | IDb | [ 4 1 3 ] | $D_2$ |
| ③ | IDc | [ 5 4 2 ] | $D_3$ |
| ④ | IDd | [ 7 3 2 ] | $D_4$ |

<RECEIVED SIGNAL OF SMART KEY DURING NORMAL OPERATION>

| ① | IDa | [ 2 7 3 ] | $D_1$ |
|---|-----|-----------|-------|
| ② | IDb | [ 2 7 3 ] | $D_2$ |
| ③ | IDc | [ 2 7 3 ] | $D_3$ |
| ④ | IDd | [ 2 7 3 ] | $D_4$ |

<RECEIVED SIGNAL OF SMART KEY DURING RELAY ATTACK>

FIG. 13

| ① | IDb | [ 4 1 3 ] | $D_2$ |
|---|---|---|---|
| ② | IDc | [ 5 4 2 ] | $D_3$ |
| ③ | IDa | [ 2 7 3 ] | $D_1$ |
| ④ | IDd | [ 7 3 2 ] | $D_4$ |

<FIRST TRANSMISSION>

| ① | IDd | [ 7 3 2 ] | $D_4$ |
|---|---|---|---|
| ② | IDa | [ 2 7 3 ] | $D_1$ |
| ③ | IDc | [ 5 4 2 ] | $D_3$ |
| ④ | IDb | [ 4 1 3 ] | $D_2$ |

<SECOND TRANSMISSION>

FIG. 14

| ① | IDb | [ 4 2 1 ] | $D_2$ |
|---|---|---|---|
| ② | IDc | [ 5 4 2 ] | $D_3$ |
| ③ | IDa | [ 2 6 3 ] | $D_1$ |
| ④ | IDd | [ 8 1 4 ] | $D_4$ |

<WHEN FIRST TRANSMISSION OF RELAY>

| ① | IDb | [ 1 3 2 ] | $D_2$ |
|---|---|---|---|
| ② | IDc | [ 5 1 2 ] | $D_3$ |
| ③ | IDa | [ 7 4 1 ] | $D_1$ |
| ④ | IDd | [ 2 3 4 ] | $D_4$ |

<WHEN SECOND TRANSMISSION OF RELAY>

SMART KEY AND METHOD OF CONTROLLING THE SAME

CROSS-REFERENCE TO RELATED APPLICATION

This application claims the benefit of and priority to Korean Patent Application No. 10-2016-0000262, filed on Jan. 4, 2016 in the Korean Intellectual Property Office, the disclosure of which is incorporated herein by reference in its entirety.

BACKGROUND

1. Technical Field

Embodiments of the present disclosure relate generally to a smart key for a vehicle and, more particularly, to a smart key which performs a certification procedure on a vehicle and a method of controlling the smart key.

2. Description of the Related Art

A smart key system allows for opening and closing of vehicle doors from outside of the vehicle and starting the vehicle without a driver performing actions such as inserting a key into a key box of the vehicle. A smart key, which is easily portable, can be, for example, a smart card, a FOB for wireless communication, etc.

When a driver carrying a smart key approaches a vehicle, the vehicle doors can be opened without insertion of a separate key by automatically releasing a lock of the doors through low frequency (LF) communication and radio frequency (RF) communication between the smart key and the vehicle. Furthermore, the vehicle can be started without inserting a key into an ignition once the driver enters into the vehicle.

Specifically, the smart key system is typically performed by: i) a transmission process of an LF signal which transmits a certificating request signal to the smart key, and ii) a reception process of an RF signal which receives a certification response signal from the smart key. In this case, due to a transmission distance limit of the LF signal in a relatively low frequency band compared to a frequency band of the RF signal, only when the smart key is located close to the vehicle can the vehicle receive the certification response signal from the smart key.

An LF signal transmitted from a vehicle is collected by an antenna or the like near the vehicle to relay the LF signal from the vehicle to a smart key located relatively far away, and then the smart key directly transmits an RF signal to the vehicle or the RF signal is collected again by the antenna or the like to relay the RF signal to the vehicle. However, security risks exist allowing wireless signals of relays to be hacked.

SUMMARY

It is an aspect of the present disclosure to provide a smart key which determines whether a wireless signal is hacked due to a relay on the basis of a vector component of an LF signal and prevents the hacking of the wireless signal, and a method of controlling the smart key.

Additional aspects of the disclosure will be set forth in part in the description which follows and, in part, will be apparent from the description, or may be learned by practice of the disclosure.

In accordance with embodiments of the present disclosure, a smart key includes: a communication unit including a low frequency (LF) antenna which receives an LF signal; and a control unit determining a strength and a direction vector of the LF signal. The control unit estimates a first location of the smart key based on the strength of the LF signal, estimates a second location of the smart key based on the direction vector of the LF signal, and determines a presence of a relay attack by analyzing the first location and the second location and comparing the first location with the second location.

The LF antenna may receive a plurality of LF signals, and the control unit may determine a strength and a direction vector of each LF signal.

The control unit may estimate the first location using triangulation based on the respective strengths of the plurality of LF signals.

The control unit may estimate the second location by determining an intersection point based on the respective direction vectors of the plurality of LF signals.

The LF antenna may include a three-dimensional LF antenna.

The control unit may determine that a relay attack is present when the first location is different than the second location.

The control unit may determine the presence of a relay attack based on whether the first location and the second location exist within a preset distance from a vehicle that transmitted the LF signal.

The control unit may determine the presence of a relay attack based on whether vector components of the plurality of LF signals are the same.

When the respective vector components of two or more LF signals among the plurality of LF signals are the same, the control unit may determine that no relay attack has occurred.

The LF antenna may receive a first plurality of LF signals and a second plurality of LF signals, and the control unit may determine vector components and identities (IDs) of the first received plurality of LF signals and the second received plurality of LF signals, and may compare the vector components and the IDs of the first received plurality of LF signals with the vector components and the IDs of the second received plurality of LF signals to determine the presence of a relay attack.

The control unit may compare the vector component of a first LF signal of the first received plurality of LF signals with the vector component of a second LF signal of the second received plurality of LF signals sharing the same ID to determine the presence of a relay attack.

The control unit may determine that a relay attack is present when the vector component of the first LF signal is different than the vector component of the second LF signal.

The control unit may determine an x-axis vector component, a y-axis vector component, and a z-axis vector component of the LF signal.

Furthermore, in accordance with embodiments of the present disclosure, a method of controlling a smart key for a vehicle includes: receiving a low frequency (LF) signal at an LF antenna; determining a strength and a direction vector of the LF signal; estimating a first location of the smart key based on the strength of the LF signal; estimating a second location of the smart key based on the direction vector of the LF signal; and determining a presence of a relay attack by analyzing the first location and the second location and comparing the first location with the second location.

The method may further include receiving a plurality of LF signals at the LF antenna, and determining a strength and a direction vector of each LF signal.

The method may further include estimating the first location using triangulation based on the respective strengths of the plurality of LF signals.

The method may further include estimating the second location by determining an intersection point based on the respective direction vectors of the plurality of LF signals.

The method may further include determining that a relay attack is present when the first location is different than the second location.

The method may further include: receiving a first plurality of LF signals and a second plurality of LF signals; determining vector components and identities (IDs) of the first received plurality of LF signals and the second received plurality of LF signals; and comparing the vector components and the IDs of the first received plurality of LF signals with the vector components and IDs of the second received plurality of LF signals to determine the presence of a relay attack.

The method may further include comparing the vector component of a first LF signal of the first received plurality of LF signals with the vector component of a second LF signal of the second received plurality of LF signals sharing the same ID to determine the presence of a relay attack.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 10 is a table for comparing vector components of normally received LF signals with vector components of LF signals received during a relay attack;

FIG. 13 is an example view of a table illustrating a plurality of LF signals transmitted according to a first transmission sequence and a second transmission sequence when the certification procedure is performed normally;

FIG. 14 is an example view of a table illustrating a plurality of LF signals transmitted when a relay attack is tried;

DETAILED DESCRIPTION OF THE EMBODIMENTS

Figure 1:
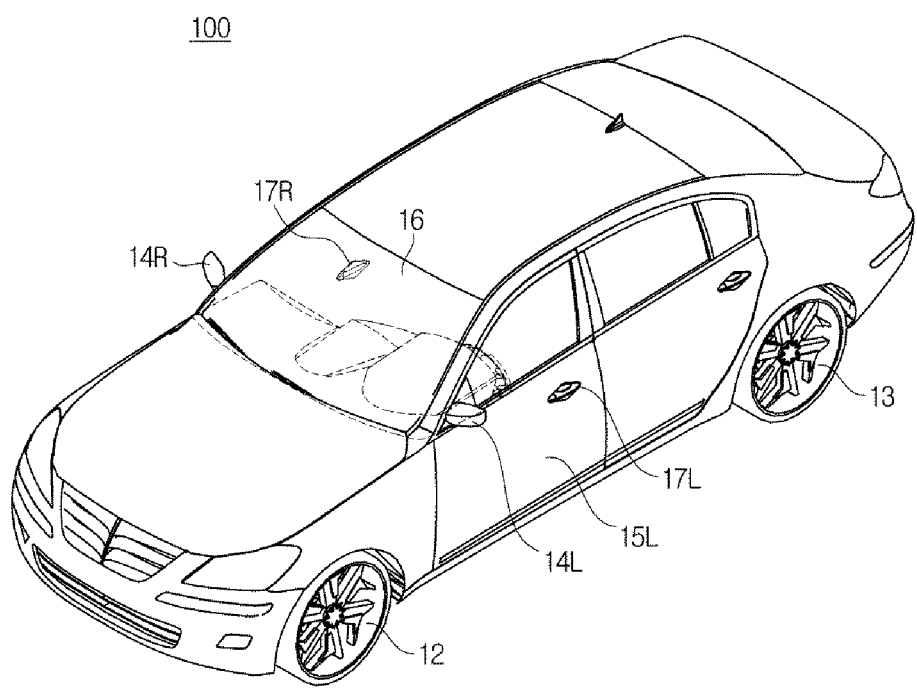
FIG. 1 is an exterior view of a vehicle according to embodiments of the present disclosure.

Hereinafter, exemplary embodiments of the present disclosure will be described in detail with reference to the accompanying drawings. Additional objects, features and operational advantages, including the object, constitution and effects of the present disclosure, will become more apparent from the detailed description of the embodiments. In this specification, when reference numerals are assigned to components of each drawing, it should be noted that, although the same components are illustrated in different drawings, the same numerals are assigned as much as possible. Further, in the following description of the present disclosure, a detailed description of known functions and configurations incorporated herein will be omitted when it may make the subject matter of the present disclosure unnecessarily unclear.

The terminology used herein is for the purpose of describing particular embodiments only and is not intended to be limiting of the disclosure. It will be understood that, although the terms "first," "second," etc. may be used herein to describe various components, these components should not be limited by these terms.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control unit. The term "control unit" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the control unit in conjunction with one or more other components, as would be appreciated by a person of ordinary skill in the art.

Figure 2:
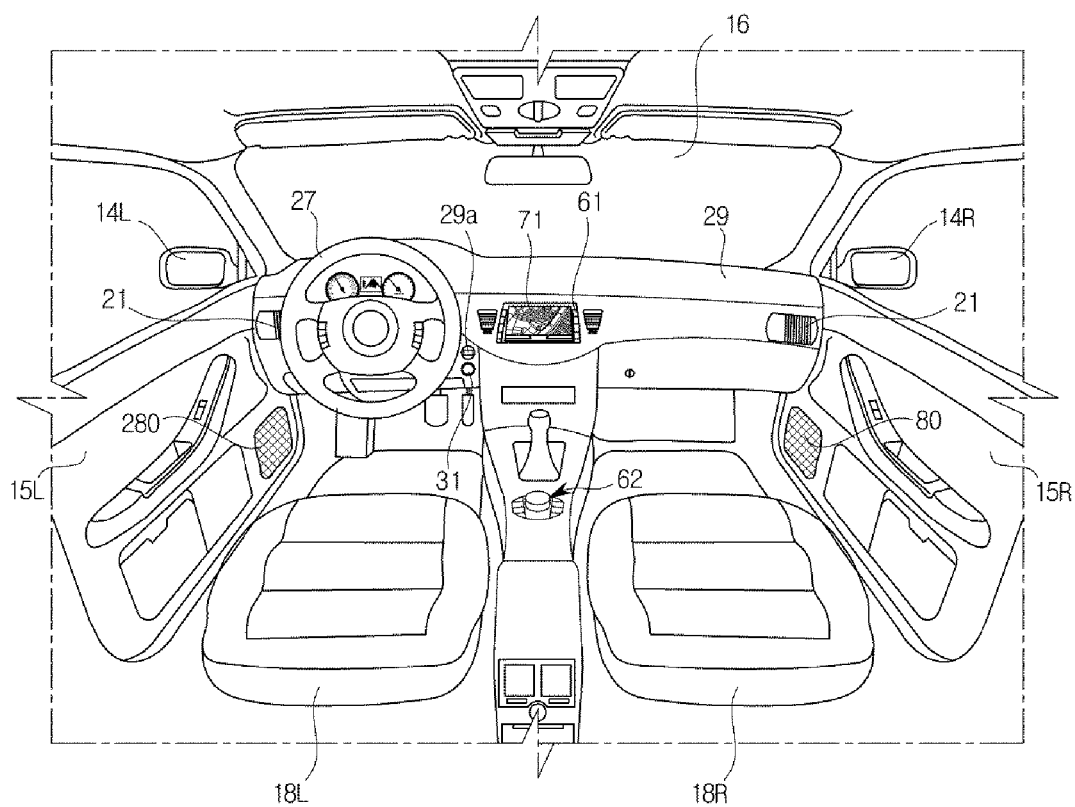
FIG. 2 is a view illustrating an internal configuration of the vehicle according to embodiments of the present disclosure.

Referring now to the presently disclosed embodiments, FIG. 1 is an exterior view of a vehicle according to embodiments of the present disclosure, and FIG. 2 is a view illustrating an internal configuration of a vehicle according to embodiments of the present disclosure.

As shown in FIG. 1, an exterior of a vehicle 100 according to embodiments includes wheels 12 and 13 which move the vehicle 100, doors 15L which shield the inside of the vehicle 100 from the outside, a front glass 16 which provides a view ahead of the vehicle 100 to a driver inside the vehicle 100, and side mirrors 14L and 14R which provide a view behind the vehicle 100 to the driver.

The wheels 12 and 13 include front wheels 12 provided in the front of the vehicle 100 and rear wheels 13 provided in the rear of the vehicle 100, and a driving device (not shown) provided inside the vehicle 100 provides rotary power to the front wheels 12 or the rear wheels 13 so that the vehicle 100 moves forward or backward, as is well-known in the art. Such a driving device may adopt an engine which generates the rotary power by burning a fossil fuel or a motor which generates the rotary power by receiving a power source from an electric condenser.

The doors 15L and 15R (see FIG. 2) are rotatably provided at left and right sides of the vehicle 100, and a driver or passenger may enter into the vehicle 100 when the door 15L or 15R is open, and the inside of the vehicle 100 is shielded from the outside when the doors 15L and 15R are closed, as is well-known in the art. Further, handles 17L and 17R capable of opening and closing the doors 15L and 15R (see FIG. 2) may be provided at outer sides of the vehicle 100, and LF antennas 111a and 111c capable of transmitting a low frequency (LF) signal (e.g., see FIG. 3) may be mounted at the handles 17L and 17R.

When a certification between a smart key 200 (e.g., see FIG. 3) and the vehicle 100 is completed through a wireless communication network, a door lock of the vehicle 100 is released, and the doors 15L may be opened by a pulling operation of the handles 17L and 17R by a user.

The front glass 16 is provided on a forward top side of the body so that the driver inside the vehicle 100 may obtain visual information ahead of the vehicle 100, and the front glass 16 is also referred to as a windshield glass.

Further, the side mirrors 14L and 14R include a left side mirror 14L provided on the left side of the vehicle 100 and a right side mirror 14R provided on the right side thereof so that the driver inside the vehicle 100 may obtain visual information in lateral and rearward directions of the vehicle 100.

In addition, the vehicle 100 may include sensors such as a proximity sensor which senses obstacles or other vehicles behind or beside the vehicle 100, a rain sensor which senses rainfall and an amount of the rainfall, etc.

The proximity sensor may transmit a sense signal from a lateral or rear surface of the vehicle, and may receive a reflected signal reflected from an obstacle such as another vehicle or the like. Whether the obstacle exists at beside or behind the vehicle 100 may be sensed and a location of the obstacle may be detected on the basis of a waveform of the received reflected signal. As an example of such a proximity sensor, a method of emitting ultrasonic waves or infrared rays and calculating a distance up to an obstacle using the ultrasonic waves or infrared rays reflected from the obstacle may be adopted.

Notably, the configuration of the exterior of the vehicle 100 is shown in FIG. 1 for demonstration purposes only and should not be treated as limiting the scope of the present disclosure to the same.

As shown in FIG. 2, an audio-video-navigation (AVN) display 71 and an AVN input unit 61 may be provided in a central region of a dashboard 29. The AVN display 71 may selectively display at least one of an audio screen, a video screen, and a navigation screen and, in addition, may display various types of control screens associated with the vehicle 100 or screens associated with additional functions.

The AVN display 71 may be implemented as a liquid crystal display (LCD), a light emitting diode (LED), a plasma display panel (PDP), an organic LED (OLED), a cathode ray tube (CRT), etc.

The AVN input unit 61 may be provided in a region adjacent to the AVN display 71 in a hard key type, or when the AVN display 71 is implemented as a touch screen type, a front surface of the AVN display 71 may be provided in a touch panel form.

Further, a center input unit 62 in a jog shuttle type may be provided between a driver's seat 18L and a passenger's seat 18R. A user may input a control command by rotating or pressing the center input unit 62 or by pushing the center input unit 62 in a vertical or lateral direction.

A sound output unit 80 capable of outputting sound may be provided in the vehicle 100, and the sound output unit 80 may be a speaker. The sound output unit 80 may output sound needed for performing an audio function, a video function, a navigation function, and other additional functions.

A steering wheel 27 is provided at the dashboard 29 in front of the driver's seat 18L, and a key groove 29a into which a smart key 200, e.g., a FOB key (e.g., see FIG. 3), is inserted may be formed in a region adjacent to the steering wheel 27. When the smart key 200 is inserted into the key groove 29a or a certification between the smart key 200 and the vehicle 100 is completed through a wireless communication network, the smart key 200 may be connected to the vehicle 100.

Further, a starting button 31 which on-off controls starting of the vehicle 100 may be provided at the dashboard 29, and when the smart key 200 is inserted into the key groove 29a or the certification between the smart key 200 and the vehicle 100 is successful through the wireless communication network, the starting of the vehicle 100 may be turned on by the starting button 31 being pressed by a user.

Meanwhile, an air conditioning device is provided in the vehicle 100 to perform both heating and cooling, and temperature inside the vehicle 100 may be controlled by discharging heated or cooled air through an air opening 21.

Notably, the configuration of the interior of the vehicle 100 is shown in FIG. 2 for demonstration purposes only and should not be treated as limiting the scope of the present disclosure to the same.

Figure 3:
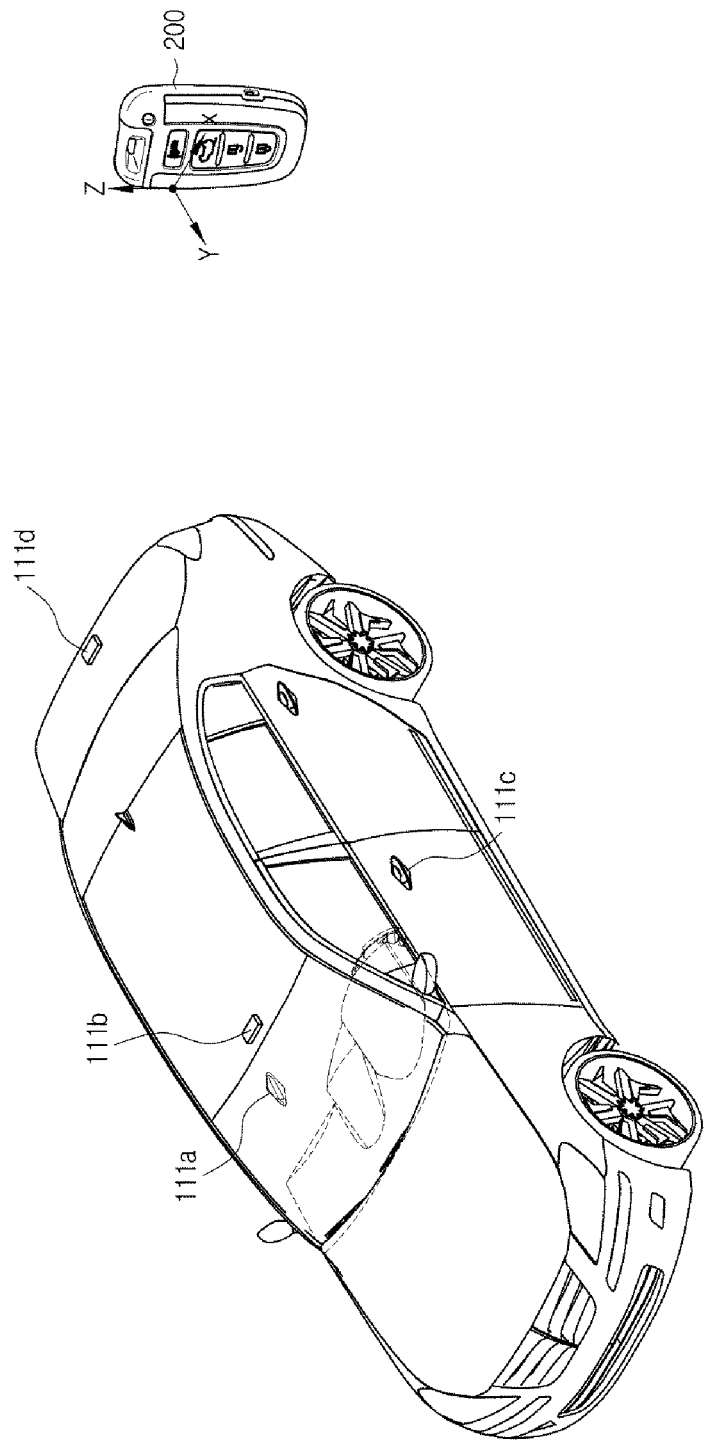
FIG. 3 is an example view of a smart key in communication with the vehicle according to embodiments of the present disclosure.

FIG. 3 is an example view of a smart key in communication with the vehicle according to embodiments of the present disclosure.

The smart key 200 is connected to the vehicle 100 by transceiving wired or wireless signals.

As an example shown in FIG. 3, the smart key 200 may be connected to the vehicle 100 through wired or wireless communication and may be a FOB key which can be used for releasing a door lock or starting and driving the vehicle.

Although the smart key 200 of the embodiment shown in FIG. 3 is not the FOB key, the smart key 200 may include any input device capable of controlling the vehicle 100 such as the above-described releasing of the door lock or the starting and driving of the vehicle. For example, when a mobile apparatus serves as a smart key, the smart key 200 shown in the disclosure may include the mobile apparatus. In this case, since an application for performing an operation of the smart key 200 is able to be installed in the mobile apparatus, the mobile apparatus may be sold with the application installed, or the mobile apparatus may download the application from a server after being sold. Further, a certification procedure may be needed for the mobile apparatus to serve as the smart key 200 of the vehicle 100.

For instance, the smart key 200 may be sold with the vehicle 100, and certification information for connecting the smart key 200 to the vehicle 100 may be pre-stored. To perform the certification procedure between the smart key 200 and the vehicle 100, signals are transceived between the smart key 200 and the vehicle 100 through an LF communication network and a radio frequency (RF) communication network.

As the LF communication network is a communication network in an LF band for transmitting an LF signal used when the vehicle 100 scans or certifies the smart key 200, the LF communication network may be a communication network in, for example, a frequency band in a range of 20 kHz to 150 kHz. When the LF signal is transceived through the LF communication network, a transceiving distance of the signal is smaller than a transceiving distance of the RF communication network in a high frequency band due to characteristics of the LF band. For example, the transceiving distance of the LF signal may be approximately 5 m, and a transceiving distance of an RF signal may be approximately 100 m.

Therefore, by transmitting the LF signal through the LF communication network, the vehicle 100 may request information needed for certification of the smart key 200 near the vehicle 100.

To transmit the LF signal, the vehicle 100 according to embodiments may include an LF communication unit 111, and the LF communication unit 111 includes one or more LF antennas 111a to 111d. The LF antennas 111a to 111d are each provided at the front, back, lateral surface, or inside of the body of the vehicle 100 and transmit LF signals at various angles with various strengths. Depending on the locations of the LF antennas 111a to 111d, receiving strengths and receiving directions of the LF signals from the smart key 200 to be described below may be different.

Hereinafter, although the LF antennas 111a to 111d are described with examples of the LF antenna 111a provided at the handle 17R of the right door 15R, the LF antenna 111c provided at the handle 17L of the left door 15L, the LF antenna 111b provided at an upper end of the body, and the LF antenna 111d provided at a trunk, the locations of the LF antennas are not limited thereto.

When the vehicle 100 transmits the LF signal through the LF antennas 111a to 111d, the smart key 200 according to one embodiment may receive the LF signal of each of the LF antennas 111a to 111d.

Here, the receiving strength of the LF signal and receiving direction of the LF signal received by the smart key 200 may vary according to relative locations of the LF antennas 111a to 111d and the smart key 200. In this case, the LF signal received by the smart key 200 may be displayed as a three-dimensional vector in an x/y/z-coordinate system.

As the RF communication network is a communication network in a high frequency band in which the vehicle 100 receives an RF signal from the smart key 200 which received the LF signal, the RF communication network may be a communication network in, for example, a frequency band in a range of 315 MHz to 433 MHz. When the RF signal is transceived through the RF communication network, the transceiving distance of the signal is greater than the transceiving distance of the LF communication network in the LF band.

Figure 4:
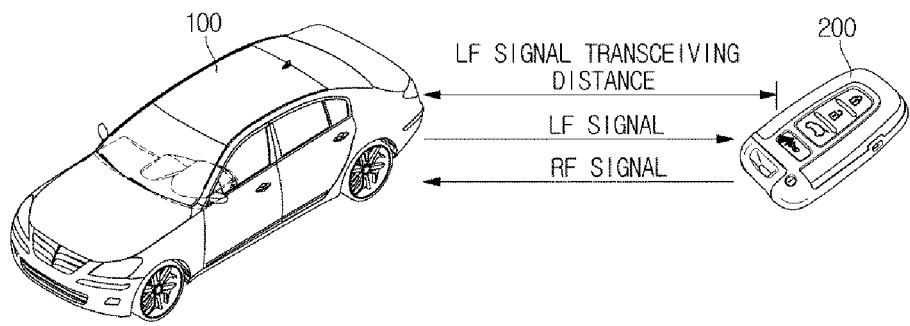
FIGS. 4 to 5C are views for describing a certification procedure between the vehicle and the smart key depending on transceiving distances of various signals.
Figure 4:
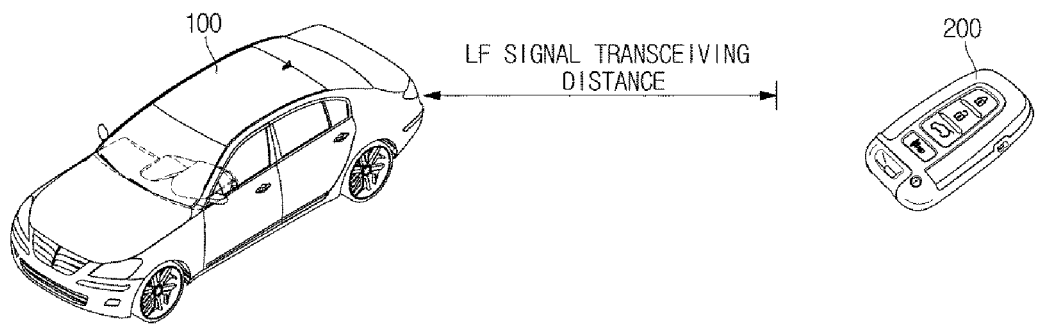
Figure 5A:
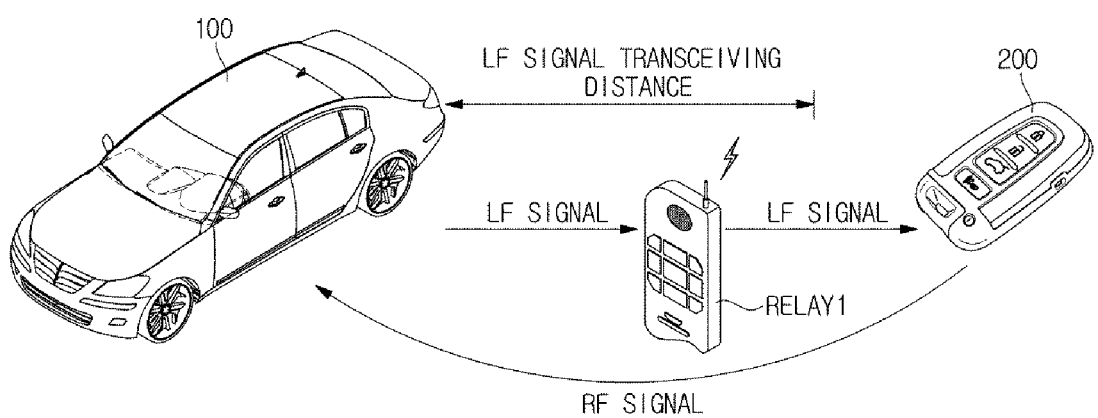
Figure 5B:
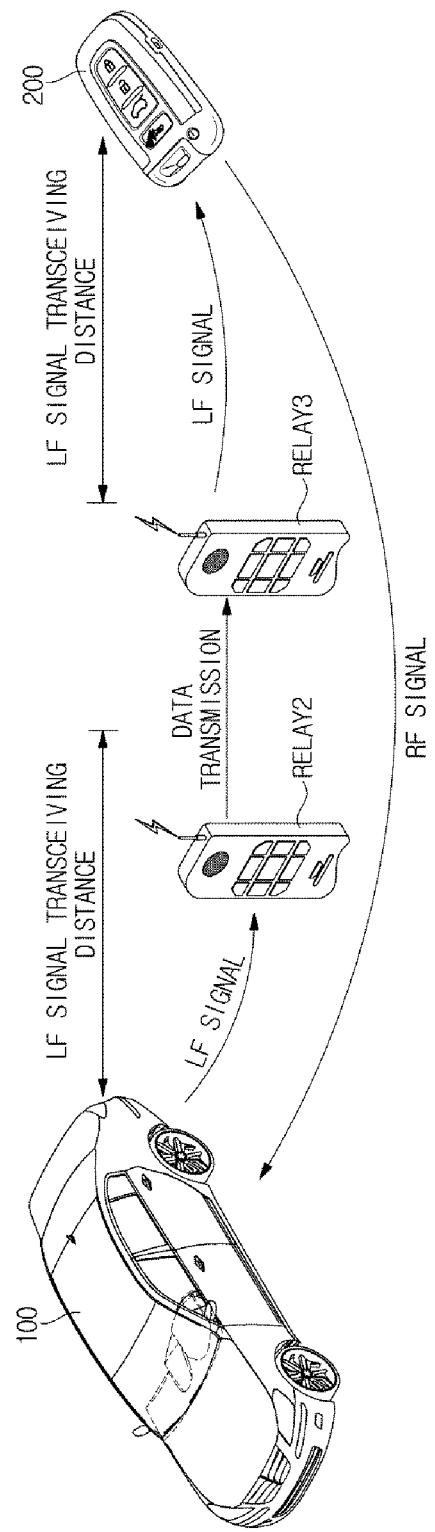
Figure 5C:
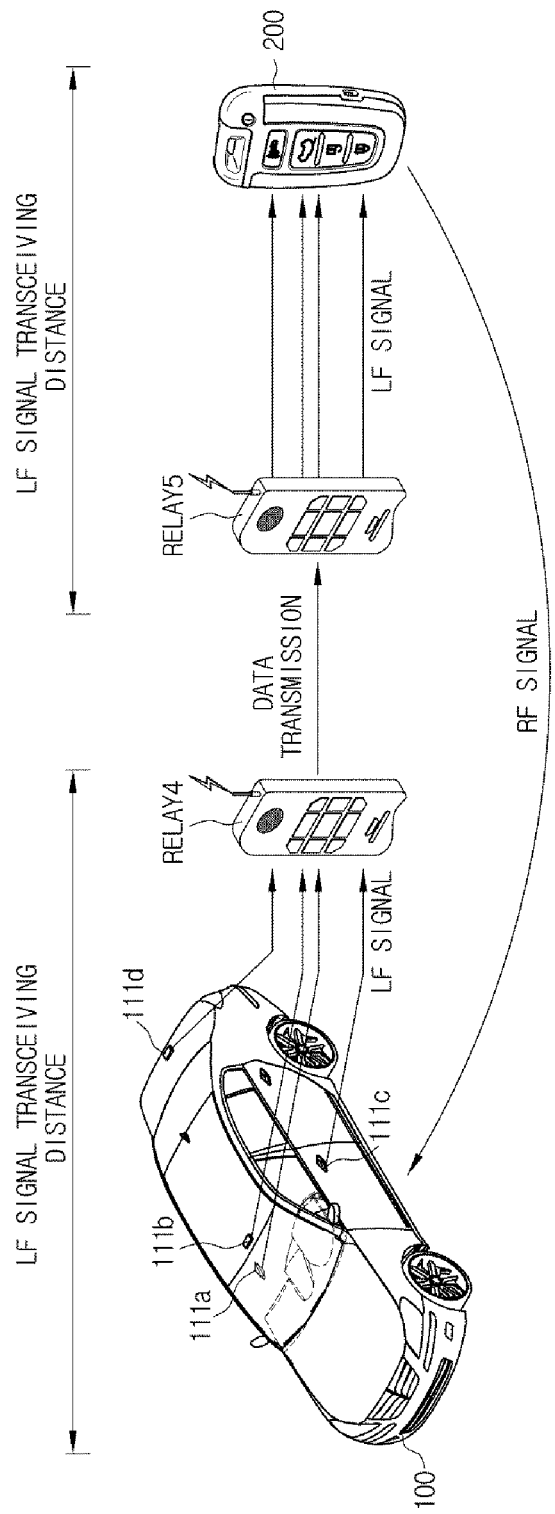

FIGS. 4 to 5C are views for describing a certification procedure between the vehicle and the smart key within transceiving distances of various signals.

As shown in FIG. 4, when the smart key 200 exists within the transceiving distance of the LF signal from the vehicle 100, the smart key 200 may receive the LF signal from the vehicle 100 through the LF communication network and may transmit the RF signal to the vehicle 100 through the RF communication network.

Meanwhile, when the smart key 200 does not exist within the transceiving distance of the LF signal from the vehicle 100, even when the vehicle 100 transmits the LF signal to the surroundings thereof through the LF communication network, the smart key 200 may not receive the LF signal. Therefore, the smart key 200 may not transmit the RF signal to the vehicle 10.

However, as shown in FIG. 5A, even when the smart key 200 does not exist within the LF signal transceiving distance, when a first relay "relay1" attempting to hack is involved in an LF signal transmiting process between the vehicle 100 and the smart key 200, the LF signal transmitted from the vehicle 100 may be transmitted to the smart key 200 through the first relay relay1 which exists within the LF signal transmitting distance from the vehicle 100 and within the LF signal transceiving distance from the smart key 200.

Further, as shown in FIG. 5B, even when the relay does not exist within the LF signal transceiving distance from the smart key 200, when a second relay "relay2" exists within the LF signal transmitting distance from the vehicle 100 and a third relay "relay3" exists within the LF signal transceiving distance from the smart key 200, the LF signal may be transmitted to the smart key 200 located far away by transmitting the LF signal transmitted from the vehicle 100 to the third relay relay3 through the second relay relay2 and transmitting the LF signal to the smart key 200 through the third relay relay3. Further, the smart key 200 existing within the RF signal transceiving distance of the vehicle 100 transmits an RF signal to the vehicle 100, and thus a certification procedure may be completed abnormally.

Further, as shown in FIG. 5C, when a plurality of LF antennas 111a to 111d are provided at different locations of the vehicle 100, and LF antennas 111a to 111d transmit different LF signals, the smart key 200 may determine a three-dimensional vector component included in the received LF signal by including a three-dimensional LF antenna.

Further, when a fourth relay "relay4" existing within the LF signal transceiving distance includes a three-dimensional LF antenna, the fourth relay relay4 may receive the LF signals transmitted from the LF antennas 111a to 111d. When the fourth relay relay4 transmits the LF signals transmitted from the vehicle 100 to a fifth relay "relay5," the fifth relay relay5 including a plurality of LF antennas may mimic the LF antennas 111a to 111d of the vehicle 100 and transmits the LF signals including vector components to the smart key 200, and thus the LF signals including the vector component may also be transmitted to the smart key 200 located far away.

Further, although not shown, even when the smart key 200 does not exist within the RF signal transceiving distance from the vehicle 100, a relay existing within the RF signal transceiving distance from the vehicle 100 and the smart key 200 transmits an RF signal from the vehicle 100 to the smart key 200, and thus the certificate procedure may be completed abnormally.

The vehicle 100 and the smart key 200 according to embodiments include the following components to determine whether a relay is involved in the certificate procedure between the vehicle 100 and the smart key 200, i.e., whether a relay attack is performed. Hereinafter, a detailed configuration and a control method of the vehicle 100 will be described.

Figure 6:
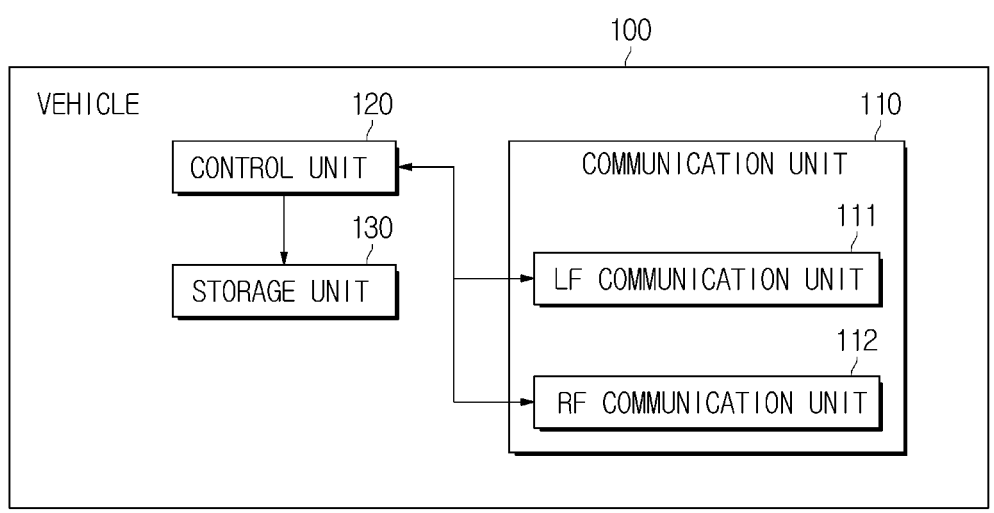
FIG. 6 is a control block diagram of the vehicle according to embodiments of the present disclosure.
Figure 7:
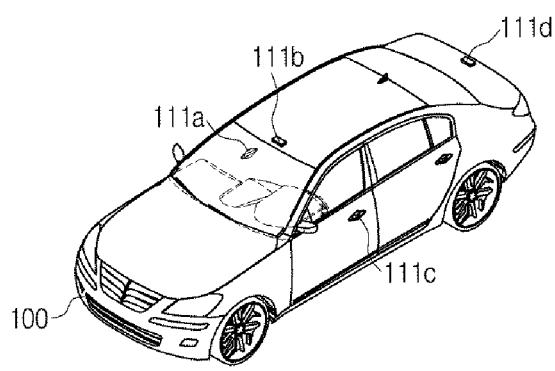
FIG. 7 is a view illustrating low frequency (LF) signals transmitted by a plurality of LF antennas of the vehicle according to embodiments of the present disclosure.
Figure 7:
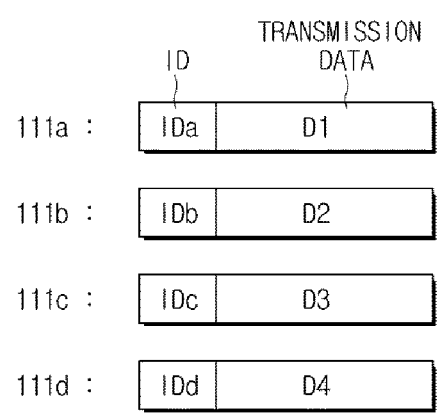

FIG. 6 is a control block diagram of the vehicle according to embodiments of the present disclosure, and FIG. 7 is a view illustrating LF signals transmitted by a plurality of LF antennas of the vehicle according to embodiments of the present disclosure.

As shown in FIG. 6, the vehicle 100 according to embodiments includes a communication unit 110 which transceives a signal with the smart key 200, a control unit 120 which controls operations of components of the vehicle 100, and a storage unit 130 which stores data.

The communication unit 110 of the vehicle 100 includes an LF communication unit 111 which transmits an LF signal within an LF transmitting distance through an LF communication network and an RF communication unit 112 which receives an RF signal within the RF transceiving distance through an RF communication network.

The LF communication unit 111 may include a communication port connecting the LF communication network and the control unit 120 and an LF communication interface including an LF transmitter which transmits the LF signal. The LF transmitter is implemented as an LF antenna, may be provided at the vehicle 100 in plurality, and may transmit LF signals at different angles and different strengths by being provided at the front, back, on lateral surfaces, or inside of the body of the vehicle 100.

As described with reference to FIG. 3, the LF antenna may include the LF antenna 111a provided at the handle 17R of the right doors 15R, the LF antenna 111c provided at the handle 17L of the left doors 15L, the LF antenna 111b provided at the upper end of the body, and the LF antenna 111d provided at the trunk.

Further, the LF communication unit 111 may further include an LF signal converting module which modulates a digital control signal output from the control unit 120 through the LF communication interface according to the control of the control unit 120 to an LF signal in an analog format.

The RF communication unit 112 may include an RF communication interface including a communication port connecting the RF communication network and the control unit 120 and a receiver which receives an RF signal. Further, the RF communication unit 112 may further include an RF signal converting module which demodulates the RF signal received through the RF communication interface in analog format to a digital control signal.

The control signal, the RF signal, and the LF signal of the vehicle 100 may be in different formats.

The control unit 120 controls each component included in the vehicle 100. The control unit 120 according to embodiments may generate LF signals corresponding to each of a plurality of LF antennas included in the vehicle 100.

Referring now to FIG. 7, the control unit 120 according to embodiments may generate the LF signals corresponding to each of the plurality of LF antennas included in the vehicle 100. The plurality of LF antennas may include a first antenna 111a, a second antenna 111b, a third antenna 111c, and a fourth antenna 111d.

The first to fourth antennas 111a to 111d may each transmit their own ID and an LF signal including data (i.e., transmitting data D1 to D4) to be transmitted. Hereinafter, the LF signals transmitted by the first to fourth antennas 111a to 111d are referred to as first to fourth LF signals, respectively. Here, the transmitting data may be, for example, information needed for certification.

Further, the control unit 120 according to embodiments may determine a transmission sequence of the plurality of LF signals. The control unit 120 may determine the transmission sequence based on a preset sequence or may randomly determine the transmission sequence. Also, the control unit 120 may determine a transmission sequence of the first to fourth LF signals. The transmission sequence of the first to fourth LF signals may be determined randomly. Further, the control unit 120 may control the first to fourth antennas 111a to 111d to transmit the LF signals according to the determined transmission sequence.

Additionally, or alternatively, the control unit 120 according to embodiments may control an LF communication unit 111 to transmit LF signals several times. That is, a first plurality of LF signals can be transmitted, and then a second plurality of LF signals can be transmitted. When the LF communication unit 111 transmits the LF signals twice, the control unit 120 may determine a first transmission sequence and a second transmission sequence. The first transmission sequence and the second transmission sequence may be the same, or may be different. In the control unit 120, the first transmission sequence and the second transmission sequence may be determined on the basis of a preset sequence or may be determined randomly.

Referring again to FIG. 6, when the RF communication unit 112 receives an RF signal, the control unit 120 may certify the smart key 200 based on certificate information included in the RF signal.

The control unit 120 may include a processor which generates a control signal according to a program and data stored in the storage unit 130.

The storage unit 130 stores a transmission sequence of the LF signals determined by the control unit 120. When the LF communication unit 111 transmits the LF signals several times, the storage unit 130 may store a first transmission sequence and a second transmission sequence determined by the control unit 120.

Further, the storage unit 130 may store certificate information mutually shared by the smart key 200 which is normally certified by the vehicle 100 and the vehicle 100. The storage unit 130 includes a memory which stores programs and data for controlling components of the vehicle 100. In some cases, the storage unit 130 and the control unit 120 may be separately implemented as a memory and a processor or may be implemented as a single device.

Figure 8:
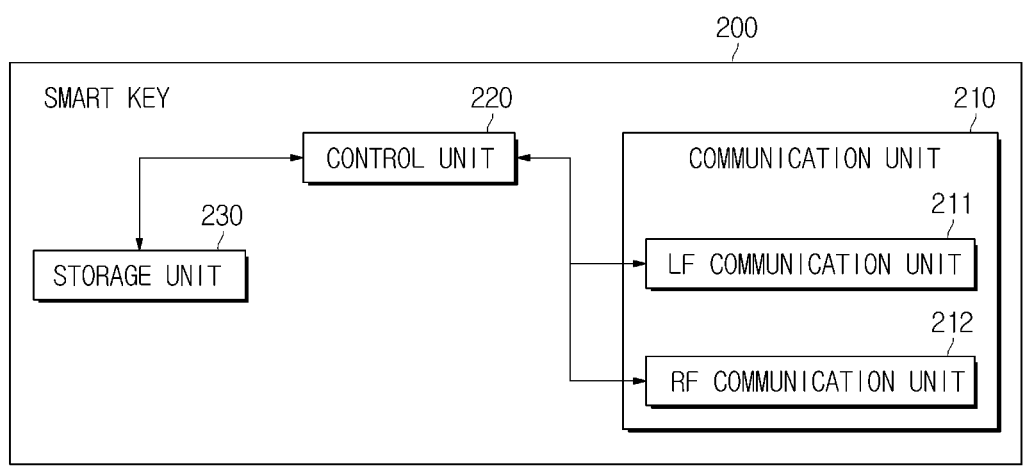
FIG. 8 is a control block diagram of the smart key according to embodiments of the present disclosure.
Figure 9:
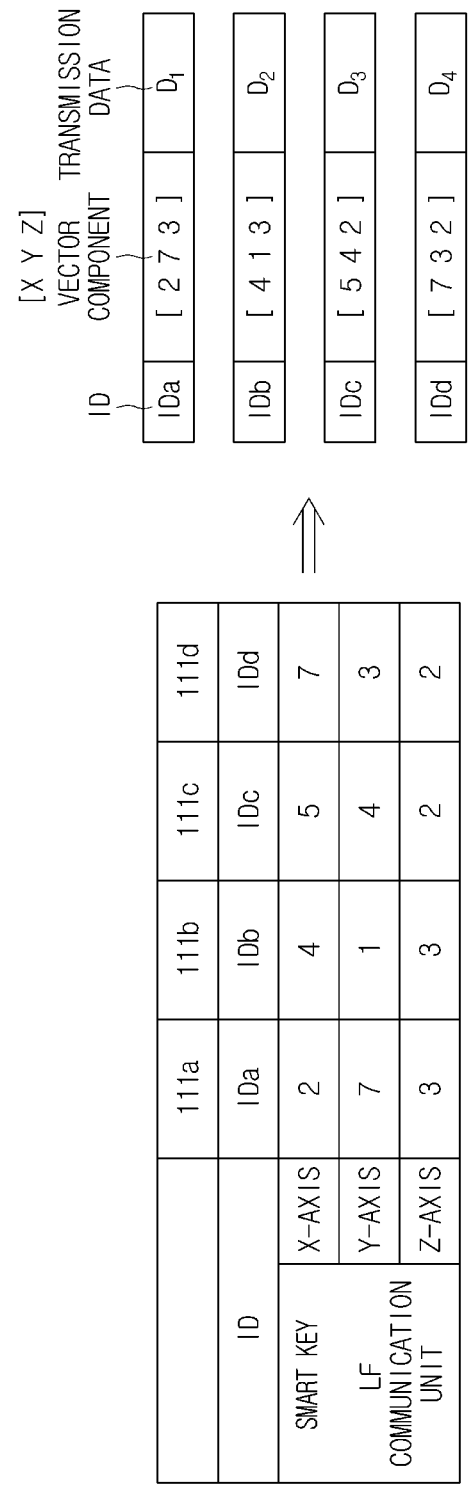
FIG. 9 is a view illustrating LF signals received by a three-dimensional LF antenna of the smart key.

FIG. 8 is a control block diagram of the smart key according to embodiments of the present disclosure, FIG. 9 is a view illustrating LF signals received by a three-dimensional LF antenna of the smart key, and FIG. 10 is a table for comparing vector components of normally received LF signals with vector components of LF signals received during a relay attack.

As shown in FIG. 8, the smart key 200 according to embodiments includes a communication unit 210 which transceives a signal with the vehicle 100, a control unit 220 which controls operations of components of the smart key 200, and a storage unit 230 which stores data.

The communication unit 210 of the smart key 200 includes an LF communication unit 211 which receives an LF signal within an LF signal receiving distance through an LF communication network and an RF communication unit 212 which transmits an RF signal within an RF signal transmitting distance through an RF communication network.

The LF communication unit 211 may include a communication port connecting the LF communication network and the control unit 220 of the smart key 200 and an LF communication interface including an LF receiver which receives the LF signal. The LF receiver may be implemented as a three-dimensional LF antenna. Since the LF communication unit 211 includes the three-dimensional LF antenna, the control unit 220 of the smart key 200 may determine a three-dimensional vector component included in the received LF signal. Here, the three-dimensional vector component includes vector components with respect to an x-axis, a y-axis, and a z-axis.

The three-dimensional vector component included in the LF signal may vary according to a relative location of the smart key 200 with respect to a transmitter which transmits the LF signal, i.e., according to a location where the three-dimensional antenna receives the LF signal. Further, the LF communication unit 211 may further include an LF signal converting module for demodulating an LF signal received through the LF communication interface in analog format to a digital control signal.

When the control unit 220 to be described below completes a certification, the RF communication unit 212 transmits an RF signal to the vehicle 100 through the RF communication network.

The RF communication unit 212 may further include an RF signal converting module which modulates the digital control signal output from the control unit 220 through the RF communication interface according to a control of the control unit 220 to an RF signal in the analog format. The control signal, the RF signal, and the LF signal of the smart key 200 may be in different formats.

The storage unit 230 includes a memory which stores programs and data for controlling each component of the smart key 200.

The control unit 220 controls each component included in the smart key 200. The control unit 220 may include a processor which generates a control signal according to programs and data stored in the storage unit 230. In some cases, the storage unit 230 and the control unit 220 may be separately implemented as a memory and a processor or may be implemented as a single device.

The control unit 220 may determine a three-dimensional vector component included in the LF signal received by the three-dimensional LF antenna. Here, the three-dimensional vector component includes vector components with respect to an x-axis, a y-axis, and a z-axis. Further, the control unit 220 may determine a direction vector and a signal strength of each LF signal on the basis of the three-dimensional vector component of each LF signal.

Referring now to FIG. 9, when the three-dimensional LF antenna of the smart key 200 receives a first LF signal transmitted by the first antenna 111a of the vehicle 100, for example, the LF signal may have a size of 2 in an x-axis direction, a size of 7 in a y-axis direction, a size of 3 in a z-axis direction. Here, when vector components of the LF signal are indicated as [x y z], the vector components of the first LF signal may be indicated as [2 7 3] corresponding to the first antenna 111a.

Further, when the three-dimensional LF antenna of the smart key 200 receives a second LF signal transmitted by the second antenna 111b of the vehicle 100, for example, the LF signal may have a size of 4 in the x-axis direction, a size of 1 in the y-axis direction, and a size of 3 in the z-axis direction. Here, the vector components of the second LF signal may be indicated as [4 1 3] corresponding to the second antenna 111b.

Further, when the three-dimensional LF antenna of the smart key 200 receives a third LF signal transmitted by the third antenna 111c of the vehicle 100, for example, the LF signal may have a size of 5 in the x-axis direction, a size of 4 in the y-axis direction, and a size of 2 in the z-axis direction. Here, the vector components of the third LF signal may be indicated as [5 4 2] corresponding to the third antenna 111c.

Further, when the three-dimensional LF antenna of the smart key 200 receives a fourth LF signal transmitted by the fourth antenna 111d of the vehicle 100, for example, the LF signal may have a size of 7 in the x-axis direction, a size of 3 in the y-axis direction, and a size of 2 in the z-axis direction. Here, the vector components of the fourth LF signal may be indicated as [7 3 2] corresponding to the fourth antenna 111d.

The control unit 220 of the smart key 200 according to embodiments decodes the plurality of received LF signals, determines an ID of each LF signal, and stores the IDs IDa, IDb, IDc, and IDd, the vectors [2 7 3], [4 1 3], [5 4 2], and [7 3 2], and data D1, D2, D3, and D4 of the LF signals in the storage unit 230 after mapping them as shown in the right side of FIG. 9.

The control unit 220 may determine which of the LF antennas 111a to 111d of the vehicle 100, which transmitted the LF signal, on the basis of the ID IDa, IDb, IDc, or IDd of each LF signal.

Meanwhile, referring now to FIG. 10, when LF signals are normally transmitted from the LF antennas 111a to 111d of the vehicle 100, since locations of the LF antennas 111a to 111d are different, vector components of the LF signals transmitted by the LF antennas 111a to 111d are different.

However, when the LF signals are transmitted by a relay including a single LF antenna, the relay may not reproduce vector components of the LF signals. Therefore, even when a plurality of LF signals are transmitted from the different LF antennas 111a to 111d of the vehicle 100, the relay may not reproduce vector components of the plurality of LF signals, and the plurality of LF signals received by the LF antennas of the smart key 200 do not form the vector components different from one another.

Therefore, the control unit 220 can compare the vector components of the plurality of LF signals and determines whether the vector components of the plurality of LF signals are the same. When the vector components of the plurality of LF signals are the same, it is determined that a relay attack is tried.

When it is determined that the relay attack has been attempted, the RF communication unit 212 of the smart key 200 may not transmit an RF signal to the vehicle 100 or an RF signal notifying generation of the relay attack may be transmitted to the vehicle 100.

Meanwhile, when the relay attack is attempted by a relay including a plurality of LF antennas, the relay may transmit an LF signal including vector components to the smart key 200. Therefore, the plurality of LF signals received by the LF antennas of the smart key 200 may form the vector components different from one another.

Therefore, the control unit 220 according to embodiments determines an intersection point of direction vectors of the plurality of LF signals and strengths of the plurality of LF signals and may determine the relay attack on the basis of information on the intersection point of the direction vectors and the strengths of the plurality of LF signals.

Figure 11:
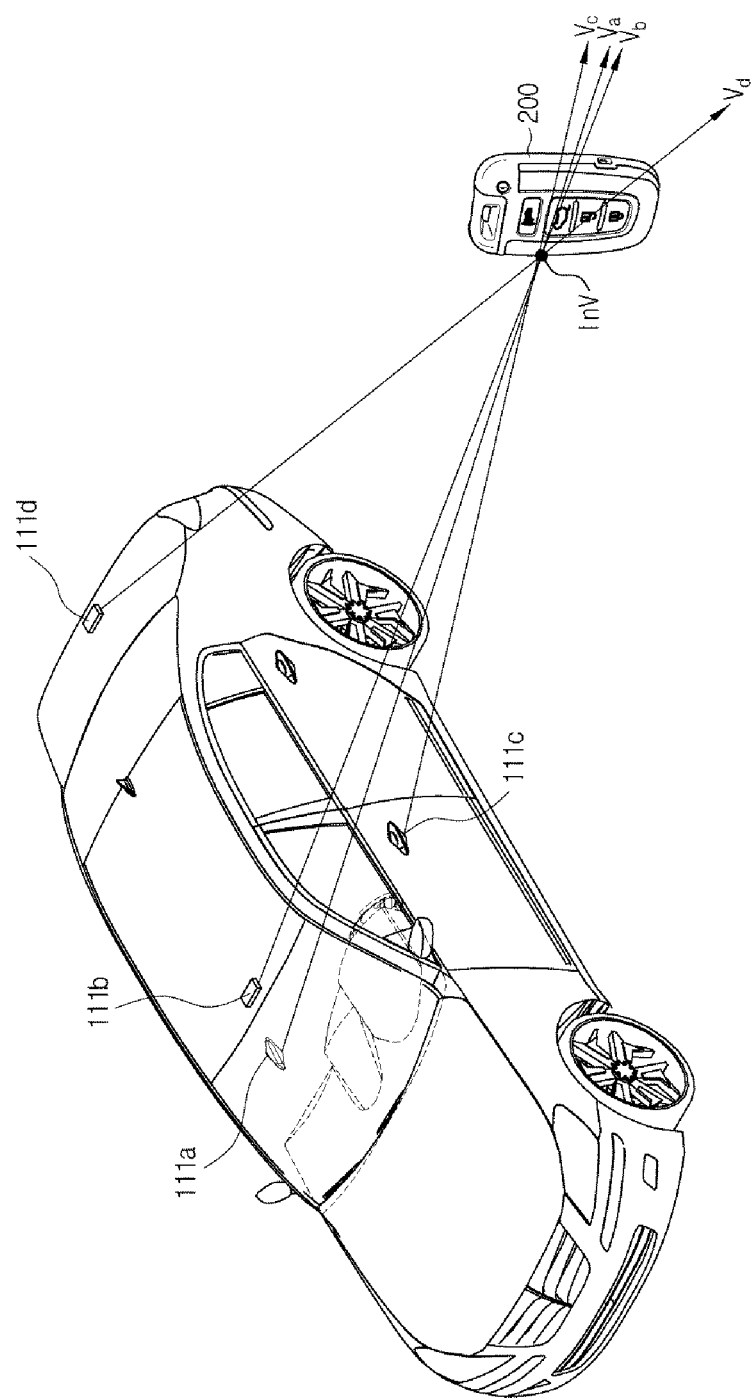
FIG. 11 is a view illustrating an intersection point of direction vectors of LF signals.
Figure 12:
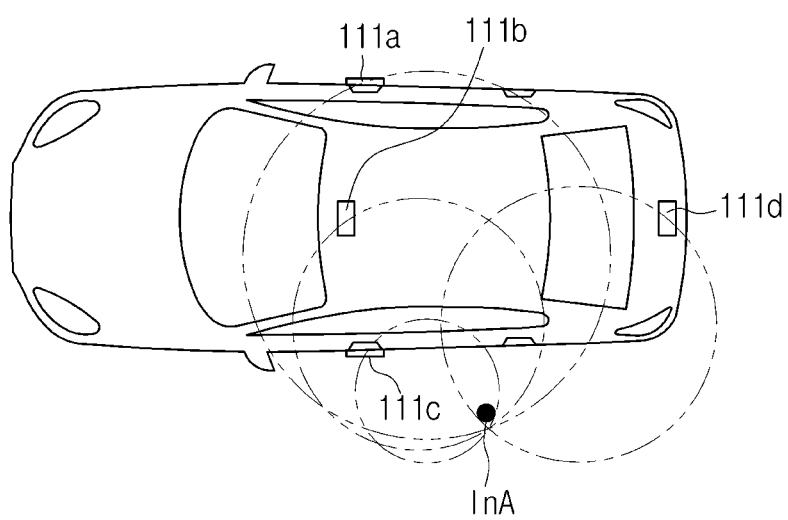
FIG. 12 is a view illustrating strengths of a plurality of LF signals detected at any one point where the smart key is located.

FIG. 11 is a view illustrating an intersection point of direction vectors of LF signals, and FIG. 12 is a view illustrating strengths of a plurality of LF signals detected at any one point where the smart key is located.

As shown in FIG. 11, a plurality of LF signals include vector components with respect to an x-axis, a y-axis, and a z-axis, and the vector component with respect to the x-axis, the y-axis, and the z-axis determines a direction vector of each LF signal and the size of the vector, i.e., the strength of the signal. The vector component of each LF signal may vary according to a location of the three-dimensional LF antenna of the smart key 200 which receives the LF signal, and the direction vector and the strength of the signal may also vary.

When Va indicates a direction vector of a first LF signal received from the first antenna 111a of the vehicle 100 by the three-dimensional LF antenna of the smart key 200, Vb indicates a direction vector of a second LF signal received from the second antenna 111b, Vc indicates a direction vector of a third LF signal received from the third antenna 111c, and Vd indicates a direction vector of a fourth LF signal received from the fourth antenna 111d, the control unit 220 of the smart key 200 may determine an intersection point of the direction vectors of the plurality of LF signals, i.e., an intersection point InV of Va, Vb, Vc, and Vd, as the current location (i.e., a first location) of the smart key 200.

Further, referring now to FIG. 12, the control unit 220 of the smart key 200 may measure each respective strength of the plurality of LF signals received by the three-dimensional LF antenna. The first to fourth antennas 111a to 111d of the vehicle 100 may have different LF signal transmitting distances, and each circle refers to points having the same strength as that of the LF signal received by each LF antenna in FIG. 12.

Therefore, the plurality of LF signals having different strengths may be measured at a point InA where the three-dimensional LF antenna of the smart key 200 is located, and the control unit 220 of the smart key 200 may determine the point InA, where the smart key 200 is located, on the basis of the measured strengths of the plurality of LF signals. For example, the control unit 220 may determine the point InA (i.e., a second location) where the smart key 200 is located using triangulation with respect to the strengths of the plurality of LF signals.

According to embodiments, the control unit 220 may determine a relay attack based on whether the intersection point InV (i.e., the first location) of the direction vectors matches the location point InA (i.e., the second location) of the smart key 200 determined on the basis of information on the strength of the LF signal (e.g., whether a distance between the intersection point InV and the location point InA is lower than a preset reference value). For example, when the distance between the first location InV and the second location InA is the reference value or more, the control unit 220 may determine that a relay attack has been tried.

Further, the control unit 220 may determine the relay attack based on whether each of the intersection point InV (i.e., the first location) of the direction vectors and the location point InA (i.e., the second location) of the smart key 200 determined on the basis of information on the strength of the LF signal exists in a region where the smart key 200 is expected to exist. For example, when the first location InV or the second location InA is not a point within a preset distance from at least one LF antenna of the vehicle 100, it may be determined as a relay attack.

Whether the first location InV or the second location InA is the point within the preset distance from the LF antenna of the vehicle 100 may be determined on the basis of a determination by the control unit 220 of a location of a component of the vehicle 100 corresponding to the ID of at least one LF signal and whether the first location InV or the second location InA exists within the preset distance from the determined location.

Further, whether the first location InV or the second location InA is a point within the preset distance from the LF antenna of the vehicle 100 may be determined on the basis of a determination by the control unit 220 of a location of a corresponding component and whether the first location InV or the second location InA exists within the preset distance from the determined location, provided information indicating which component (e.g., the steering wheel 27) of the vehicle 100 that transmitted the LF signal is further included.

When it is determined that the relay attack is tried, the RF communication unit 212 of the smart key 200 may not transmit an RF signal to the vehicle 100 or may transmit an RF signal notifying generation of the relay attack.

Further, when LF signals are transmitted from the vehicle 100 several times, a control unit 220 of a smart key 200 according to another embodiment determines an ID of each LF signal by determining vector components of a plurality of LF signals transmitted according to a first transmission sequence, and decoding each of the LF signals. Further, the plurality of LF signals transmitted according to a second transmission sequence are decoded, and whether vector components of the plurality of LF signals transmitted according to the second transmission sequence respectively match vector components of the plurality of LF signals transmitted according to the first transmission sequence is determined.

FIG. 13 is an example view of a table illustrating a plurality of LF signals transmitted according to a first transmission sequence and a second transmission sequence when the certification procedure is performed normally, and FIG. 14 is an example view of a table illustrating a plurality of LF signals transmitted when a relay attack is tried.

As shown in FIG. 13, when a plurality of LF signals are transmitted from the vehicle 100, a control unit 220 of a smart key 200 according to embodiments can determine the transmission as a first transmission, determine a vector component of each LF signal, and decode each LF signal. The ID and the transmission data of each LF signal are extracted by the decoding. Further, the control unit 220 of the smart key 200 performs mapping of the ID, the vector component, and the transmission data of a first LF signal and stores the mapping data in the storage unit 230 as information on each LF signal received by the first transmission.

For example, when an LF signal corresponding to the second antenna 111b, an LF signal corresponding to the third antenna 111c, an LF signal corresponding to the first antenna 111a, and an LF signal corresponding to the fourth antenna 111d are sequentially transmitted, the control unit 220 determines the LF signals as a first transmission, and determines vector components [4 1 3], [5 4 2], [2 7 3], and [7 3 2] corresponding to the LF signals. Further, the LF signals are decoded to extract IDs IDb, IDc, IDa, and IDd and transmission data D2, D3, D1, and D4 corresponding to the LF signals, and performs mapping of the IDs, the vector components, and the transmission data corresponding to the LF signal and stores the mapping data in the storage unit 230.

Further, when a plurality of LF signals are retransmitted from the vehicle 100, the control unit 220 of the smart key 200 according to embodiments determines the LF signals as a second transmission, determines a vector component of each LF signal, and decodes each LF signal. The ID and transmission data of each LF signal are extracted by the decoding.

When a preset number of LF signals (e.g., four LF signals in FIG. 13) are transmitted, the control unit 220 may determine the LF signals as a first transmission, and then, when the LF signals of which the number (four) is the same as the number of the LF signals of the first transmission are retransmitted, the control unit 220 may determine the LF signals as a second transmission. Further, when a preset number of LF signals are transmitted, the control unit 220 may determine the LF signals as the first transmission, and when a plurality of LF signals are retransmitted with a time difference, the control unit 220 may determine the LF signals as the second transmission. Further, the control unit 220 of the smart key 200 performs mapping of the ID, the vector component, and the transmission data of a second LF signal as information corresponding to each LF signal received by the second transmission, and performs comparing and analyzing of the information corresponding to each LF signal received by the first transmission.

For example, when a fourth LF signal corresponding to the fourth antenna 111d, a first LF signal corresponding to the first antenna 111a, a third LF signal corresponding to the third antenna 111c, and a second LF signal corresponding to the second antenna 111b are sequentially transmitted, the control unit 220 determines the LF signals as the second transmission and determines vector components [7 3 2], [2 7 3], [5 4 2], and [4 1 3] corresponding to the LF signals. Further, the LF signals are decoded to extract IDs IDd, IDa, IDc, and IDb and transmission data D4, D1, D3, and D2 corresponding to the LF signals, and the vector component of the LF signal corresponding to the first transmission and the vector component of the LF signal corresponding to the second transmission with the same ID are compared.

Further, when the vector component corresponding to the first transmission does not match the vector component corresponding to the second transmission for at least one ID, the control unit 220 of the smart key 200 may determine that a relay attack has been tried.

In FIG. 13, the vector component of the LF signal corresponding to the first transmission of IDa is [2 7 3], and the vector component of the LF signal corresponding to the second transmission of IDa is [2 7 3]. The vector component of the LF signal corresponding to the first transmission of IDb is [4 1 3], and the vector component of the LF signal corresponding to the second transmission of IDb is [4 1 3]. The vector component of the LF signal corresponding to the first transmission of IDc is [5 4 2], and the vector component of the LF signal corresponding to the second transmission of IDc is [5 4 2]. The vector component of the LF signal corresponding to the first transmission of IDd is [7 3 2], and the vector component of the LF signal corresponding to the second transmission of IDd is [7 3 2].

In this case, since the vector component of the first transmission matches the vector component of the second transmission for each ID, the control unit 220 may determine that a relay attack has not been attempted.

However, when the relay attack has been attempted (i.e., the presence of a relay attack has been determined), a relay does not perform the second transmission, or even when the second transmission is performed, since the second transmission is performed at a different location from that of the first transmission as shown in FIG. 14, the vector component of the first transmission and the vector component of the second transmission corresponding to each ID are different.

Therefore, the control unit 220 according to embodiments may additionally, or alternatively, determine the presence of a relay attack by comparing the vector component of the first transmission and the vector component of the second transmission for each ID. When it is determined that the relay attack has been tried, the RF communication unit 212 of the smart key 200 may not transmit an RF signal to the vehicle 100 or may transmit an RF signal notifying generation of the relay attack.

Hereinafter, a method of controlling the vehicle 100 and the smart key 200 will be described with reference to FIGS. 15 and 16. Since components of the vehicle 100 and the smart key 200 described with reference to FIGS. 15 and 16 are the same components of the vehicle 100 and the smart key 200 described with reference to FIGS. 1 to 14, the same reference numbers are used for the following description.

Figure 15:
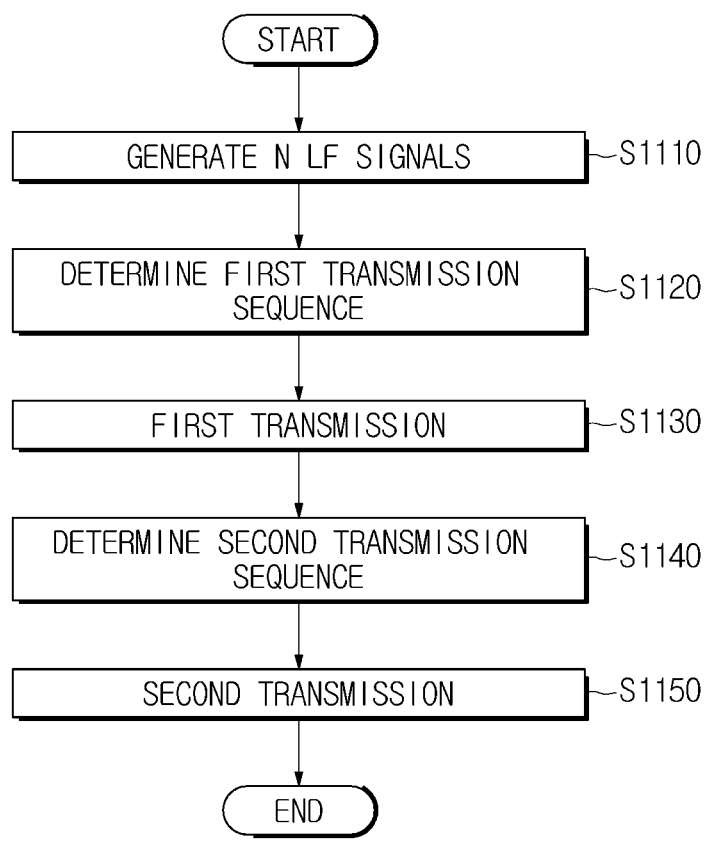
FIG. 15 is a flowchart of a method of controlling the vehicle according to embodiments of the present disclosure.
Figure 16:
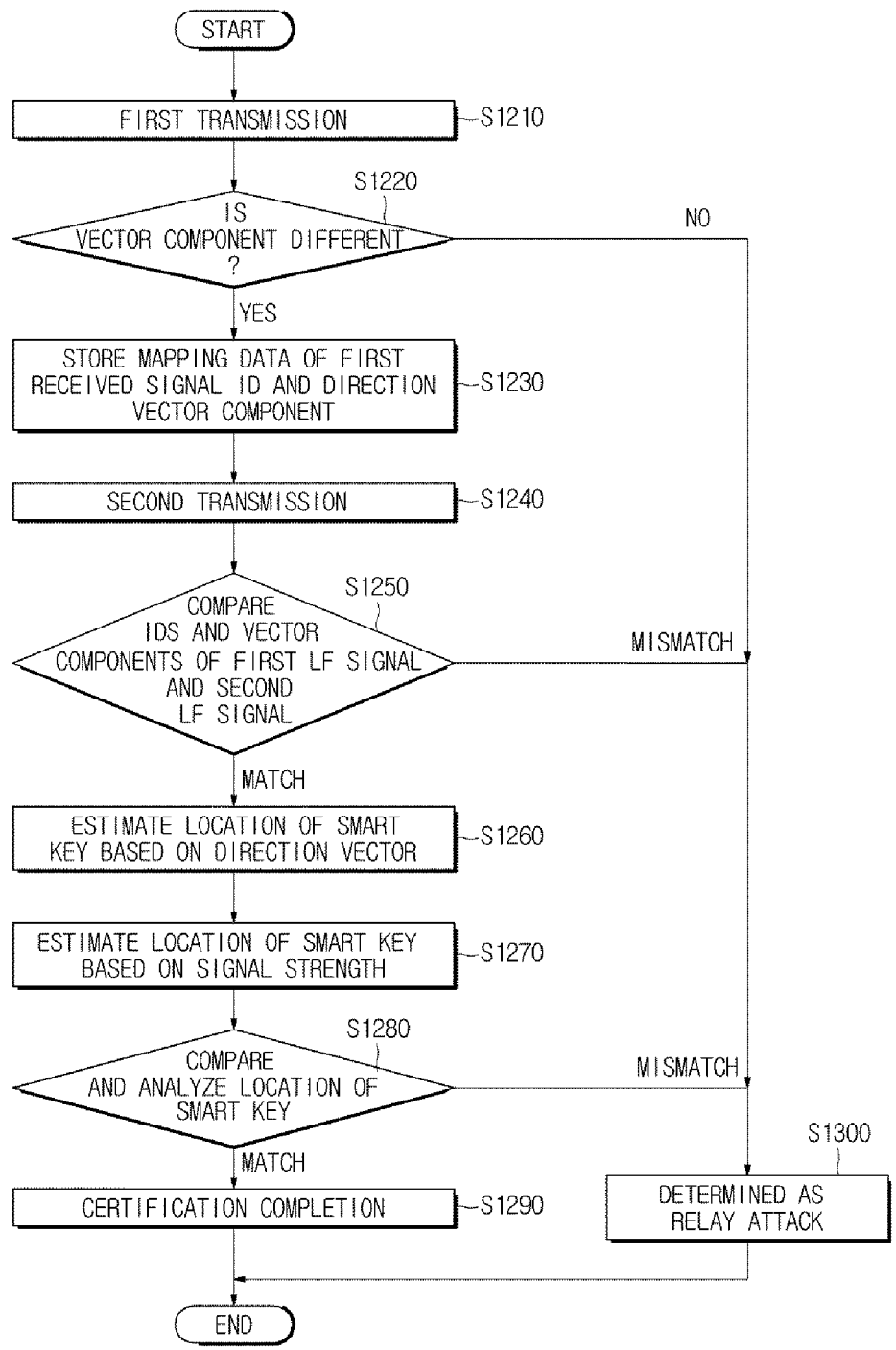
FIG. 16 is a flowchart of a method of controlling the smart key according to embodiments of the present disclosure.

FIG. 15 is a flowchart of a method of controlling the vehicle according to embodiments of the present disclosure, and FIG. 16 is a flowchart of a method of controlling the smart key embodiments of the present disclosure. The method of controlling the vehicle and the smart key is not limited to including all operations described with reference to FIGS. 15 and 16, and any of the operations may be omitted. Further, a control sequence of the operations is not limited to the following description, As shown in FIG. 15, first, the control unit 120 of the vehicle 100 generates a plurality of LF signals (N LF signals) corresponding to each of a plurality of LF antennas (S1110) and determines a first transmission sequence of the plurality of LF signals (S1120). Then, the plurality of LF antennas transmit the LF signals according to the first transmission sequence (S1130).

Further, the control unit 120 of the vehicle 100 determines a second transmission sequence of the plurality of LF signals (S1140), and the plurality of LF antennas retransmit the LF signals according to the second transmission sequence (S1150). Each of the first transmission sequence and the second transmission sequence may be a preset sequence or a random sequence.

As shown in FIG. 16, the three-dimensional LF antenna of the smart key 200 receives a plurality of LF signals transmitted from a plurality of LF antennas (S1210). In this case, when a preset number of LF signals are transmitted, the control unit 220 of the smart key 200 may determine the transmission as a reception of the plurality of LF signals according to a first transmission of the vehicle 100.

Then, the control unit 220 of the smart key 200 determines a vector component of each LF signal and determines whether the vector components of the plurality of LF signals are distinguished from one another (S1220). Here, the control unit 220 may determine the size of a vector and a direction vector on the basis of the vector component.

When at least a pair or more of the plurality of LF signals are different from one another ("yes" in S1220), the control unit 220 performs a subsequent operation, but when all of the plurality of LF signals are the same ("no" in S1220), it is determined that a relay attack has been attempted (i.e., a relay attack is present) (S1300).

Then, when at least a pair or more of the plurality of LF signals are different from each other ("yes" in S1220), the control unit 220 of the smart key 200 decodes the plurality of LF signals according to the first transmission and determines a vector component of each LF signal. Further, an ID and transmission data of each LF signal extracted by the decoding are mapped with the vector component, and a mapping table is stored in the storage unit 230 (S1230).

Then, the three-dimensional LF antenna of the smart key 200 receives the plurality of LF signals transmitted from the plurality of LF antennas again (S1240). When the same number of LF signals as the number of the LF signals of the first transmission is retransmitted, the control unit 220 of the smart key 200 may determine the retransmission as a reception of the plurality of LF signals according to the second transmission of the vehicle 100. Further, when the plurality of LF signals are retransmitted with a time difference, the control unit 220 may also determine the retransmission as the reception of the plurality of LF signals according to the second transmission.

In this case, the control unit 220 of the smart key 200 determines vector components of the plurality of LF signals according to the second transmission, and decodes the LF signals to extract an ID and transmission data of each LF signal. Then, the control unit 220 of the smart key 200 performs mapping of the ID, the vector component, and the transmission data of the second LF signal as information corresponding to each LF signal received by the second transmission and performs comparing and analyzing of the information corresponding to each LF signal received by the first transmission (S1250).

When the vector component of the first transmission does not match the vector component of the second transmission corresponding to at least one ID ("mismatch" in S1250), the control unit 220 of the smart key 200 may determine that a relay attack has been tried (S1300).

However, when the vector components of the first transmission match the vector components of the second transmission corresponding to all IDs ("match" in S1250), the control unit 220 of the smart key 200 may measure a direction vector and a signal strength of each LF signal on the basis of the vector components of the plurality of received LF signals and may estimate a location of the smart key 200 on the basis of the direction vector and the signal strength of each measured LF signal (S1260 and S1270).

Specifically, the control unit 220 of the smart key 200 may estimate the location of the smart key 200 based on an intersection point of direction vectors of the plurality of LF signals (S1260) and may estimate a point where the smart key 200 is located using triangulation with respect to the strengths of the plurality of LF signals (S1270).

Then, the control unit 220 of the smart key 200 compares and analyzes the intersection point of the direction vectors and the location point of the smart key 200 based on the signal strengths (S1280). Specifically, the control unit 220 may determine the relay attack based on whether the intersection point (i.e., a first location) of the direction vectors matches a second location of the smart key 200 determined using information on the strength of the LF signal.

Further, when a distance between the first location and the second location is a reference value or more (i.e., the first location does not match the second location), the control unit 220 may determine that a relay attack has been tried (S1300).

Additionally, or alternatively, the control unit 220 of the smart key 200 may determine the presence of the relay attack based on whether each of the intersection point InV (i.e., the first location) of the direction vectors and the location point InA (i.e., the second location) of the smart key 200 determined on the basis of information on the strength of the LF signal exists in a region where the smart key 200 is expected to exist. For example, when the first location InV or the second location InA is not a point within a preset distance from at least one LF antenna of the vehicle 100, the control unit 220 may make a determination of a relay attack.

Whether the first location InV or the second location InA is a point within the preset distance from the LF antenna of the vehicle 100 may be determined based on a determination of the control unit 220 for a location of a component of the vehicle 100 corresponding to an ID of the at least one LF signal and whether the first location InV or the second location InA exists within the preset distance from the determined location.

Further, whether the first location InV or the second location InA is a point within the preset distance from the LF antenna of the vehicle 100 may be determined on the basis of a determination of the control unit 220 for a location of a corresponding component and whether the first location InV or the second location InA exists within the preset distance from the determined location, provided information indicating which component (e.g., the steering wheel 27) of the vehicle 100 that transmitted the LF signal is further included.

When it is determined that the relay attack has been tried, the RF communication unit 212 of the smart key 200 may not transmit an RF signal to the vehicle 100 or may transmit an RF signal notifying generation of the relay attack. However, when a distance between the first location and the second location is smaller than the reference value (i.e., the first location matches the second location), the control unit 220 completes certification (S1290) and performs an operation according to the certification completion.

In addition, when the first location InV and the second location InA are points within the preset distance from at least one LF antenna of the vehicle 100, the control unit 220 completes the certification and may also perform an operation according to the certification completion. For example, the operation according to the certification completion includes transmitting an RF signal including a certification completion message to the vehicle 100 by the RF communication unit 212.

The above-described embodiment has been described such that the smart key 200 determines the relay attack, but information (e.g., vector components) on the plurality of LF signals transmitted according to the first transmission and the second transmission may be transmitted to the vehicle 100, and the relay attack may also be determined by the vehicle 100.

As is apparent from the above description, in the smart key according to the embodiments of the disclosure and the method of controlling the smart key, since strength and a direction vector of a received LF signal is determined, a relay which abnormally tries a certification and a vehicle which normally tries a certification can be distinguished, and a hacking of the relay can be prevented.

The above description exemplarily describes the present disclosure and one skilled in the art may understand that the present disclosure can be easily modified into another form without changing the technical spirit or the essential features of the present disclosure. Therefore, it should be understood that the above-described exemplary embodiments are only the examples in all aspects and the present disclosure is not limited thereto. For example, each element which is described as single member may be formed as separated elements. Similarly, elements which are described as separated members may be formed as single element.

The scope of the present disclosure is represented by the following claims rather than the above detail description, and it should be understood that the meaning and the scope of claims and all modified or changed forms derived from the claims and their equivalents fall within the scope of the present disclosure.

What is claimed is:

1. A smart key for a vehicle comprising:
   a communication unit including a low frequency (LF) antenna which receives an LF signal; and
   a control unit determining a strength and a direction vector of the LF signal,
   wherein the control unit estimates a first location of the smart key based on the strength of the LF signal, estimates a second location of the smart key based on the direction vector of the LF signal, and determines a presence of a relay attack by analyzing the first location and the second location and comparing the first location with the second location.

2. The smart key of claim 1, wherein:
   the LF antenna receives a plurality of LF signals; and
   the control unit determines a strength and a direction vector of each LF signal.

3. The smart key of claim 2, wherein the control unit estimates the first location using triangulation based on the respective strengths of the plurality of LF signals.

4. The smart key of claim 2, wherein the control unit estimates the second location by determining an intersection point based on the respective direction vectors of the plurality of LF signals.

5. The smart key of claim 1, wherein the LF antenna includes a three-dimensional LF antenna.

6. The smart key of claim 1, wherein the control unit determines that a relay attack is present when the first location is different than the second location.

7. The smart key of claim 1, wherein the control unit determines the presence of a relay attack based on whether the first location and the second location exist within a preset distance from a vehicle that transmitted the LF signal.

8. The smart key of claim 2, wherein the control unit determines the presence of a relay attack based on whether vector components of the plurality of LF signals are the same.

9. The smart key of claim 8, wherein, when the respective vector components of two or more LF signals among the plurality of LF signals are the same, the control unit determines that no relay attack has occurred.

10. The smart key of claim 1, wherein:
    the LF antenna receives a first plurality of LF signals and a second plurality of LF signals; and
    the control unit determines vector components and identities (IDs) of the first received plurality of LF signals and the second received plurality of LF signals, and compares the vector components and the IDs of the first received plurality of LF signals with the vector components and IDs of the second received plurality of LF signals to determine the presence of a relay attack.

11. The smart key of claim 10, wherein the control unit compares the vector component of a first LF signal of the first received plurality of LF signals with the vector component of a second LF signal of the second received plurality of LF signals sharing the same ID to determine the presence of a relay attack.

12. The smart key of claim 10, wherein the control unit determines that a relay attack is present when the vector component of the first LF signal is different than the vector component of the second LF signal.

13. The smart key of claim 1, wherein the control unit determines an x-axis vector component, a y-axis vector component, and a z-axis vector component of the LF signal.

14. A method of controlling a smart key for a vehicle, comprising:
    receiving a low frequency (LF) signal at an LF antenna;
    determining a strength and a direction vector of the LF signal;
    estimating a first location of the smart key based on the strength of the LF signal;
    estimating a second location of the smart key based on the direction vector of the LF signal; and
    determining a presence of a relay attack by analyzing the first location and the second location and comparing the first location with the second location.

15. The method of claim 14, further comprising:
    receiving a plurality of LF signals at the LF antenna; and
    determining a strength and a direction vector of each LF signal.

16. The method of claim 15, further comprising estimating the first location using triangulation based on the respective strengths of the plurality of LF signals.

17. The method of claim 15, further comprising estimating the second location by determining an intersection point based on the respective direction vectors of the plurality of LF signals.

18. The method of claim 14, determining that a relay attack is present when the first location is different than the second location.

19. The method of claim 14, further comprising:
    receiving a first plurality of LF signals and a second plurality of LF signals;
    determining vector components and identities (IDs) of the first received plurality of LF signals and the second received plurality of LF signals; and
    comparing the vector components and the IDs of the first received plurality of LF signals with the vector components and IDs of the second received plurality of LF signals to determine the presence of a relay attack.

20. The method of claim 19, further comprising comparing the vector component of a first LF signal of the first received plurality of LF signals with the vector component of a second LF signal of the second received plurality of LF signals sharing the same ID to determine the presence of a relay attack.

* * * * *